Figure 1:
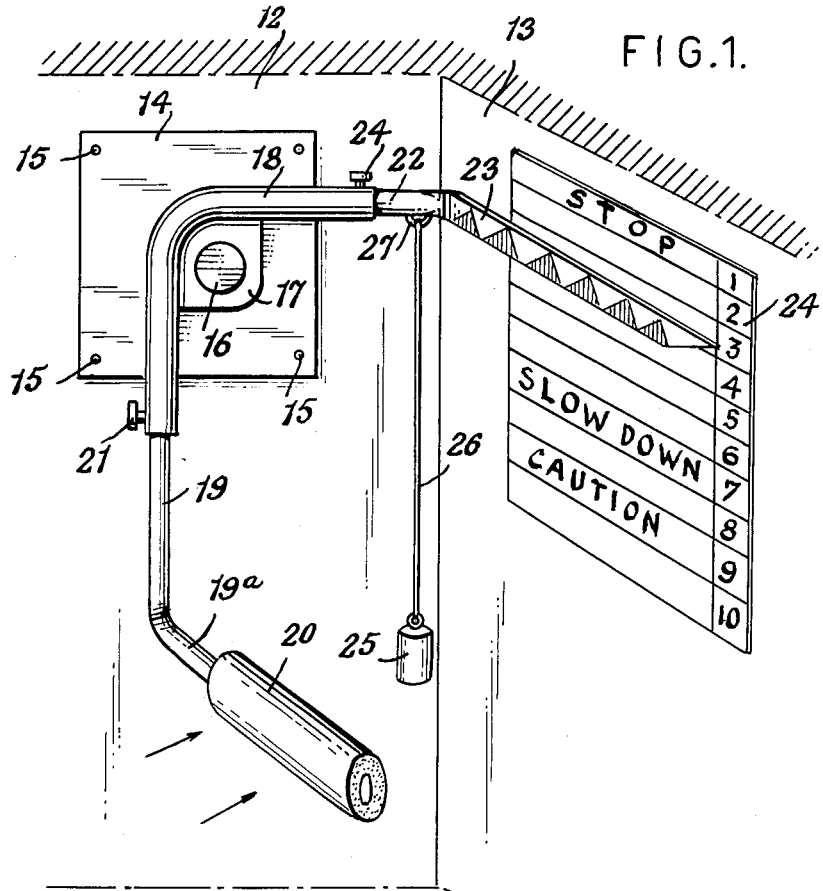

July 19, 1966  O. MANDL  3,261,321
PARKING DEVICE

Filed Feb. 1, 1965  4 Sheets-Sheet 1

INVENTOR.
OTTO MANDL
BY
Attorney

July 19, 1966  O. MANDL  3,261,321
PARKING DEVICE
Filed Feb. 1, 1965  4 Sheets-Sheet 2
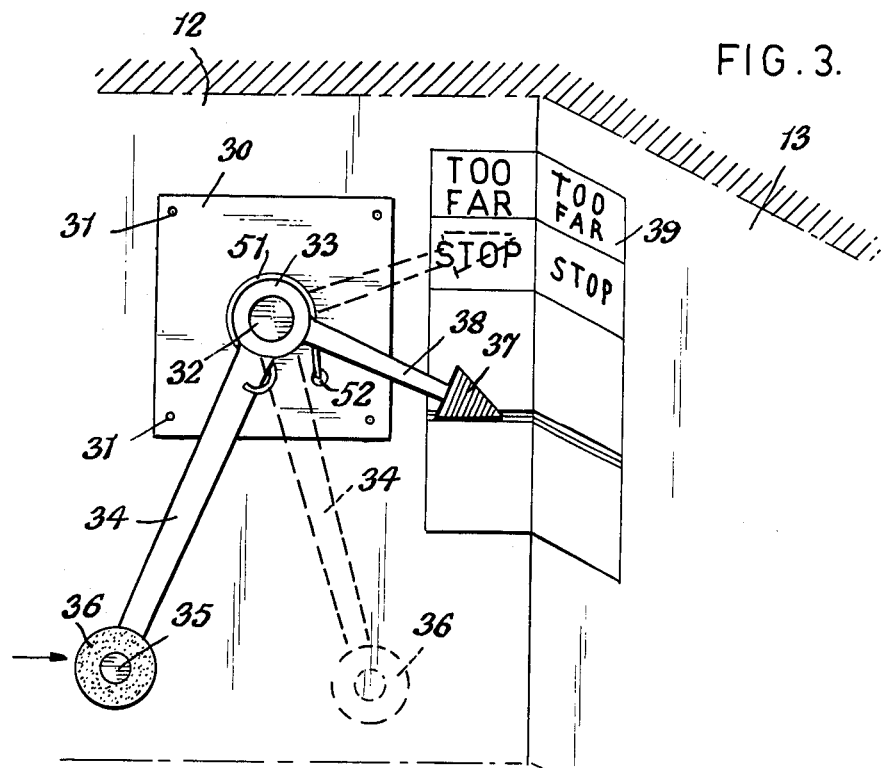
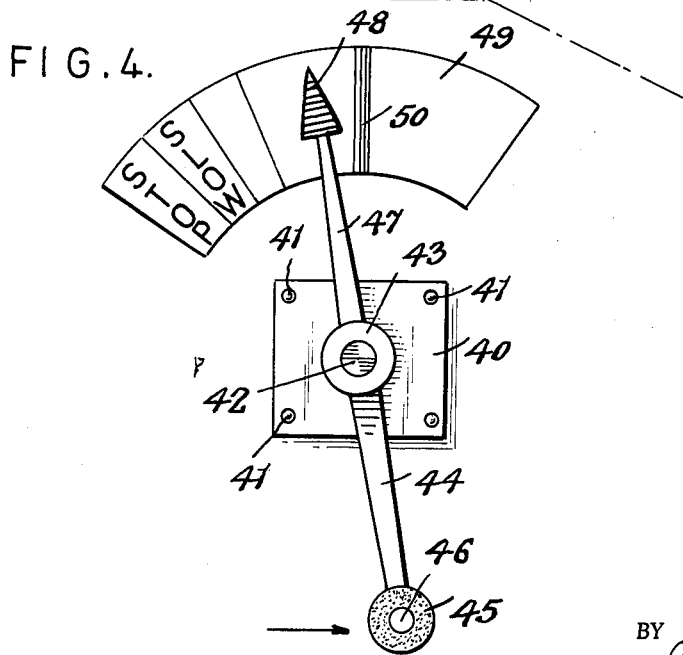
INVENTOR.
OTTO MANDL
BY *Attorney*

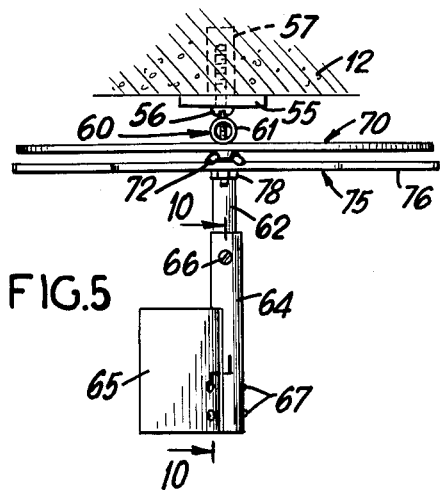
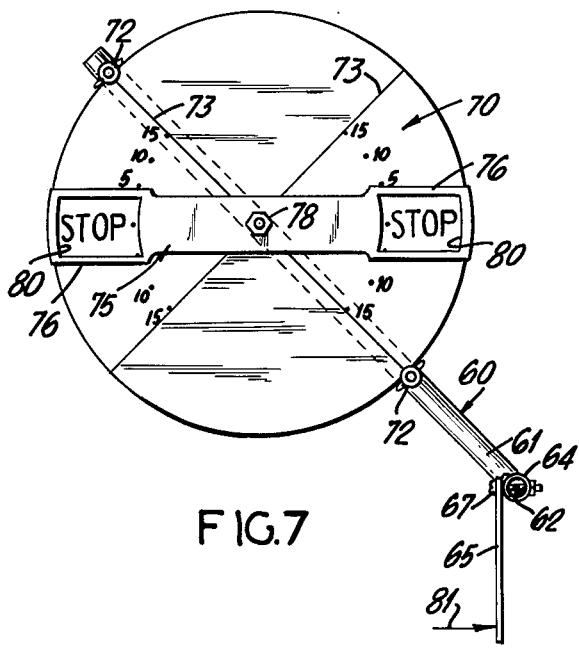
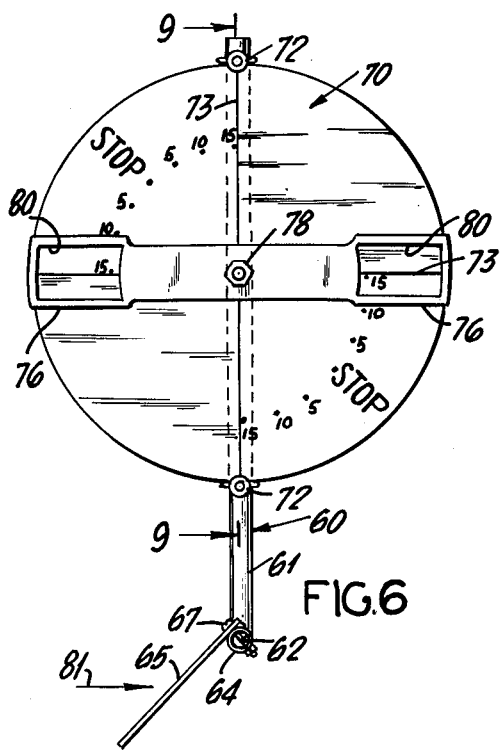
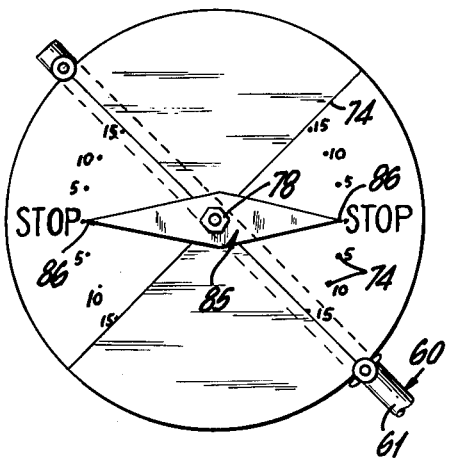
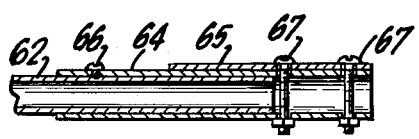

July 19, 1966     O. MANDL     3,261,321
PARKING DEVICE
Filed Feb. 1, 1965     4 Sheets-Sheet 4

INVENTOR
OTTO MANDL

BY Alfred E. Page

ATTORNEYS

United States Patent Office 3,261,321
Patented July 19, 1966

3,261,321
PARKING DEVICE
Otto Mandl, 1419 Eva Court, Baldwin, Long Island, N.Y.
Filed Feb. 1, 1965, Ser. No. 431,243
20 Claims. (Cl. 116—28)

This invention relates to devices for indicating the position of a car with respect to an obstruction such as the rear wall of a garage and, more particularly, to a novel indicator of this type which is simple and inexpensive in construction and which, in one form, may be readily and interchangeably mounted on either side wall of the garage. This application is a continuation-in-part of my copending application Serial No. 308,994, filed September 16, 1963, for "Parking Indicators," now abandoned.

There has been a long felt need for a simple and inexpensive device by which the operator or driver of the car, engaged in parking the car in a limited space, may be easily and constantly visually advised of the distance between an end of the car and an obstruction in the path of movement of the car such as, for example, the rear wall of a garage into which the car is either being driven forwardly or is being backed. An arrangement of this type would avoid the possibility of forceable contact between front or rear bumper of the car and the rear wall of the garage, for example, or any other obstruction which may be in the path of movement of the car.

While many suggestions have been made for providing an arrangement for this purpose, the previously suggested devices have either been excessively complicated in construction, very expensive to purchase and install, or not capable of ready installation by an unskilled person. Consequently, such indicators have not yet been successfully marketed commercially.

An object of the invention is to provide a car position or parking indicator which may be readily mounted on the wall of a garage.

Another object of the invention is to provide a car position indicator which is simple in construction, includes only one moving part and which is effective to indicate to the operator of a car, at all times, the proper parking position for the car.

A further object of the invention is to provide a car position indicator which is simple and inexpensive in construction and which may be readily assembled and mounted by an unskilled person.

Yet another object of the invention is to provide a car position indicator which, without change of parts, is readily and easily adaptable to mounting on either side wall of a garage and which will not only provide an indication of the proper parked position of the car, but also of the approach of the car toward the parked position.

More particularly, the car position or parking indicator of the invention includes a member arranged to be mounted on a side wall of a garage, or the like, for angular displacement with respect to a second member which is fixed against movement. The first member includes an arm or lever provided with an off-set lower end disposed in the path of movement of the car and arranged to contact with a part of a car, such as one or the other of its bumpers or a wheel, this first member further including an indicating means associated with a second indicating means, such as a scale or chart mounted on a wall of the garage. The cooperation of the end of the first member, constituting a first indicator element, and particularly its indicating means, which the scale or chart, constituting another indicator element, provides a continuous visual indication to the driver, as the car is driven into the garage and toward a wall thereof, of the relative distance of the end of the car from the rear wall, whereby possible forceable contact or collision with the wall is prevented.

For an understanding of the principles of the invention, reference is made to the following description of typical embodiments thereof as illustrated in the accompanying drawings.

Figure 2:
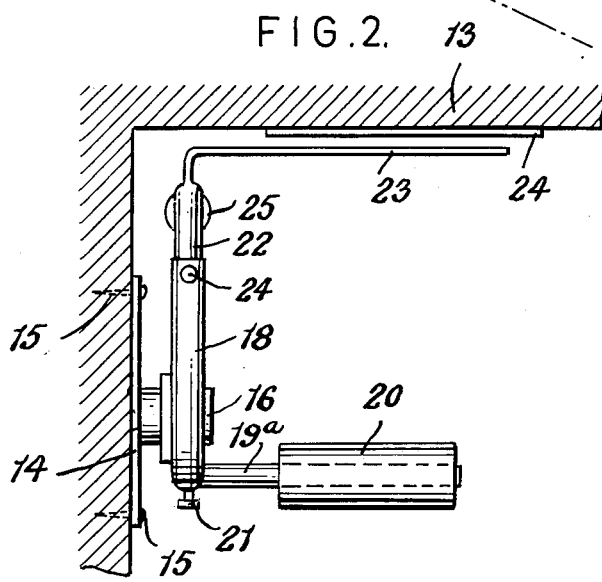
Figure 12:
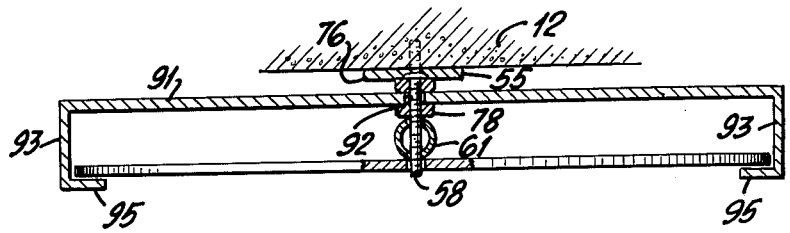
Figure 9:
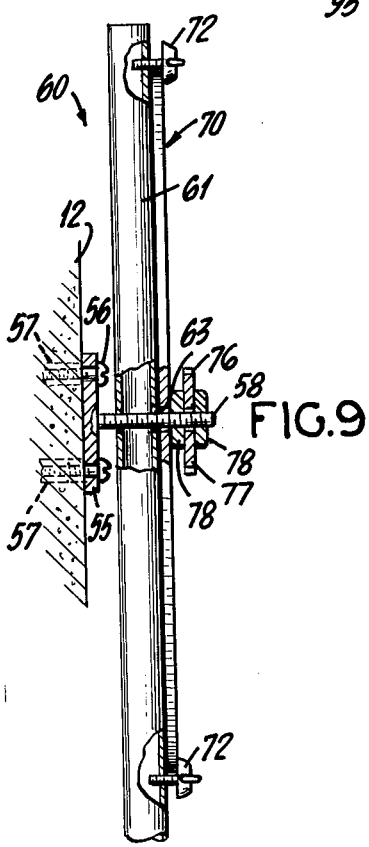
Figure 11:
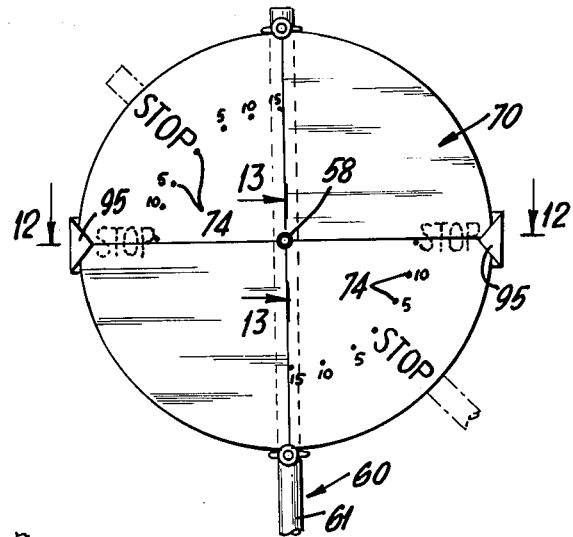
Figure 13:
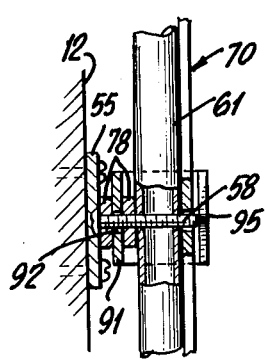

In the drawings:
FIG. 1 is a perspective view of one embodiment of a car position or parking indicator in accordance with the invention;
FIG. 2 is a top plan view of the indicator shown in FIG. 1;
FIG. 3 is an elevation view of another form of indicator embodying the invention;
FIG. 4 is an elevation view of yet another form of indicator embodying the invention;
FIG. 5 is a top plan view of a preferred form of car position or parking indicator embodying the invention;
FIG. 6 is a front elevation view of the indicator shown in FIG. 5;
FIG. 7 is a view similar to FIG. 6, but showing the indicator in another position;
FIG. 8 is a front elevation view illustrating a modification of the indicator shown in FIGS. 5, 6 and 7;
FIG. 9 is a sectional view of the indicator shown in FIGS. 5, 6 and 7, taken on the line 9—9 of FIG. 6;
FIG. 10 is a sectional view of the indicator shown in FIGS. 5, 6 and 7, taken on the line 10—10 of FIG. 5;
FIG. 11 is a front elevation view of another modified form of the indicator shown in FIGS. 5, 6 and 7;
FIG. 12 is a sectional view taken on the line 12—12 of FIG. 11; and
FIG. 13 is a sectional view taken on the line 13—13 of FIG. 11.

Referring to the drawings, and more particularly to FIGS. 1 and 2 thereof, 12 indicates one of the walls, such as a side wall, of a garage or other enclosure in which a car is to be parked. The rear wall thereof, or that toward which the car is driven while being parked, is indicated at 13, said wall being disposed at right angles to the side wall 12.

Suitably mounted on the side wall 12 is a mounting plate 14, the same being fastened to the wall by means of nails, screws or other equivalent fasteners 15. The plate 14 is provided with a projecting stud shaft 16 upon which a hub plate 17 of the tubular portion 18 of a bell-crank lever is rotatably mounted. Adjustably secured in one of the arms of the tubular portion 18 is a bent rod 19 provided at its lower end with an off-set, laterally projecting extension 19a which is covered with a protective covering 20 or other suitable material to thereby protect the car when it is brought into contact with said rubber-covered extension 19a. As an alternative, the rubber covering might be in the form of a roller rotatively mounted on the extension 19a. The rod 19 is vertically adjustable in the tubular part 18 to thereby position the part 19a at the proper height to contact with a required part of a car, such as its bumper or other part, when the car is driven toward parking position.

The off-set extension 19a and its covered portion 20 are maintained in the proper adjusted position by means of a set screw 21 and are disposed in the path of travel of a car when the car is driven forwardly or is backed into the garage space intended for it and when the car is so driven toward parking position, a portion of it, such as its front or rear bumper or possibly one of its wheels, will contact with the part 19a and pivotally move the lever as indicated by the arrows in FIG. 1.

The second arm of the tubular part of bell-crank lever 18 carries an adjustable extension 22 formed with an angular flattened part 23 constituting an indicator or pointer. A set screw 24 maintains the pointer in a required extended position and disposed adjacent to a calibrated chart or scale 25 mounted on the rear wall 13 of the garage and in such a position and at the required height so that it is clearly visible to the driver of the car entering the space intended for his car. This arrangement is such that when the bell-crank lever 18 is moved around its pivot 16 by the contact of its parts 19a and 20 with a part of the moving car, the pointer 23 will resultantly be moved. The chart or scale 25 is suitably calibrated to indicate to the driver various positions at which he is required to exercise caution, slow down or stop, and it may bear other markings as required, such as the numerals at the right side of the scale designating distances from the rear wall.

Thus, the driver of the car, by watching the position of the pointer on the chart or scale can halt the car at the proper location and thus avoid the possibility of collision with the rear wall of the garage.

The normal or inoperative rest position of the bell-crank lever 18 is when the pointer is at the bottom of the scale 25, the same being normally maintained in this position by means of a counter-weight indicated at 26 and which is suspended by a cable 27 from an eyelet 28 provided on the pointer portion 22.

From the foregoing, the operation of the improved parking indicator will be apparent. As a car is driven into a garage, it will contact with the covered portion 20 of the extension 19a and will thus pivotally swing the bell-crank lever 18 to the extent designated by the pointer 23 on the chart or scale 25. When the pointer indicates the "STOP" position on the scale, the car can be halted in a properly parked position. The device is such that with reasonable care and watchfulness used by the driver, a car can be readily parked without the likelihood of damage to it or to the walls of the garage.

In the embodiment shown in FIG. 3, the mounting plate 30 is secured to the side wall 12 of the garage by the fasteners 31, and said plate is provided with a stud shaft 32 and upon which the hub 5 of a bell-crank lever generally indicated at 33, is rotatively mounted. Projecting radially from the hub 5 is an arm 34, provided at its outer or free end with an off-set, laterally projecting extension 35 provided with a protective covering 36. The second arm of the bell-crank lever 33 is in the form of a pointer and has its free end provided with a designating arrow head 37, said arm being indicated at 38.

Provided adjacent to the headed end of the pointer 38 and on one or both of the walls of the garage, is a chart or scale 39, the same being calibrated or divided into sections designating proper and improper positions in parking. The scale is so arranged that it can be seen both from the front of the car and from its side window. This arrangement is such that the car, when contacting the parts 35, 36 will pivotally swing the ball-crank lever 33 in the direction of the arrow in FIG. 3 and as indicated in dotted lines therein to the extent designated by the pointer, thereby enabling the driver of the car to halt it at the required point.

In the embodiment of the invention shown in FIG. 4, there is shown an arrangement adapted for mounting on one of the side walls of a garage. The mounting plate is shown at 40, the same being fastened to the wall by fasteners 41. A stud shaft 42 projects from the plate and the hub 43 of a lever is rotative on said shaft. The lever includes an arm 44 having its lower end formed with an off-set extension 46 suitably covered with protective material 45 adapted to contact with the car when it is driven toward paring position. The lever also includes an arm 47, constituting a pointer and terminating in the arrow head 48 which is movable across a calibrated scale 49 mounted on the wall behind the pointer. The scale is mounted so that it is visible to the driver through the side window of the car, and it bears suitable designations, such as "STOP," "SLOW" and possible other precautionary words. The arm portion 44 may be weighted so that the lever will normally hang vertically, with its arrow head 48 at the line 50 which designates the inoperative or rest position of the device.

It has been suggested that the levers used in the embodiments of the invention be weighted or counter-balanced to maintain them in their inoperative or rest positions when not being under the urge of the car. As shown in FIG. 3, the lever can, if desired, be retracted by spring means. Therein a torsional spring 51 is used, one end of the same engaging the arm 34 and its opposite end engaging an aperture 52 in the mounting plate 30.

Referring to FIGS. 5, 6 and 7, the preferred form of a car position indicator shown therein includes a substantially flat and preferably rectangular mounting plate 55 which is secured to either side wall of the garage, such as the left wall 12, by a pair of screws 56 fitted into plugs 57 inserted into the material of wall 12. A threaded stud 58 projects outwardly, and preferably centrally, from plate 55.

The movable means of the indicator includes a L-shaped lever 60, which is of tubular stock, and an indicating disk 70 which is a flat and preferably circular piece of material, such as metal, hardboard, or the like. Lever 60 includes a relatively elongated normally upright arm 61 and a relatively shorter normally horizontal arm 62 which preferably extends at right angles outwardly from the lower end of arm 61. Arm 61 is formed with aligned, internally threaded apertures 63, intermediate its ends and somewhat nearer its upper end. Apertures 63 provide for lever 60 to be threaded onto stud 48, thereby fixing the position of lever 60 axially of stud 58. For example, lever arm 61 may be threaded inwardly along stud 58 until lever arm 61 has a predetermined clearance, such as ½", with plate 55. The threaded interengagement of apertures 63 and stud 58 provides a low friction bearing for arm 61 of lever 60, so that lever 60 may be freely angularly displaced, without the use of excessive force. Additionally, arm 61 is retained against any substantial displacement along stud 58 as, in practice, lever 60 is swung through an arc of only about 45°. This eliminates the need for spaces or retaining nuts to fix the spacing of arm 61 from plate 55.

Arm 62, as stated, projects outwardly from the wall of the garage and is arranged to have telescoped thereover an extension tubing or member 64 which can be held in a longitudinal and angularly adjusted position on arm 62 by means of a set screw 66. Adjacent its outer end, extension tubing 64 is formed with two pairs of diametrically aligned apertures arranged to receive bolts and nuts 67 disengageably securing a contact plate 65 thereto. By provision of the releasable bolts and nuts 67, plate 65 may be secured on either "side" of extension tubing 64, as viewed in FIG. 10.

Disk 70 is formed with a central aperture 71 having a diameter somewhat in excess of the maximum exterior diameter of stud 58 so that disk 70 is freely rotatable on stud 58. In assembling the parts, tubular lever 60 is threaded onto stud 58 to a position in which it has an effective clearance, such as ½", with plate 55. Disk 61 is then placed on stud 58 against the outer surface of lever 61, with arm 62 of lever 60 extending parallel to stud 58, and then disk 70 is secured in correct angular adjustment to arm 61 of lever 60 by means of wing screws 72 each threaded into an aperture in arm 61 and each having a head clamping disk 70 against arm 61. Thereby disk 70 and lever 60 swing as a unit about stud 58 as an axis. The apertures in arm 61 receiving the set screws 72 are so located that the stems of wing screws 72 are substantially in engagement with the circular periphery of disk 70.

Referring more particularly to FIGS. 6 and 7, disk 70 is marked, by lines such as 73, so as to be divided into four quadrants each having an extent of substantially 90°. As viewed in FIG. 6, at approximately the central positions of the "northwest" and "southeast" quadrants, the word "STOP" is imprinted adjacent the periphery of disk 70.

Thus, the two words "STOP" are positioned at substantially 45° from both the vertical and the horizontal, and one of the two lines 73 extends horizontally and the other line extends vertically. The purpose of this arrangement will become apparent, but it should be noted that the normally vertical line 73 is aligned with the longer arm 61 of tubular L-lever 60. Each of the two diametrically opposite quadrants containing the word "STOP" is further provided with a series of reference indications 74 which, starting from the 45° position at which there is the word "STOP," are labeled "0," "5," "10" and "15," in each direction from "0," these marks 74 being arranged on the circumference of a circle of somewhat less diameter than the diameter of disk 70. The purpose of these marks will be made apparent hereinafter. It will be appreciated that the reference marks 74 are spaced angularly approximately 15° from each other.

Disk 70, included in the first member of the indicator, cooperates with a second member or fixed indicator 75. In the embodiment of the invention shown in FIGS. 5, 6, 7, 9 and 10, this fixed indicator 75 is what may be termed a "window" indicator, and is in the form of a substantially flat bar which is enlarged at each end, as at 76, to provide a substantially rectangular window 80. Fixed indicator 75 is provided with a central aperture 77 which is somewhat larger in diameter than the maximum external diameter of stud 58, so that aperture 77 will freely receive stud 58. For the purpose of holding fixed indicator 75 against movement, indicator 75 is clamped between a pair of nuts 78, 78 which are threaded onto stud 58, as best seen in FIG. 9. The inner nut 78 is first threaded onto stud 58, after which indicator 75 is positioned over stud 58 and against inner nut 78. With indicator 75 held horizontal, the second nut 78 is threaded onto stud 58 to clamp indicator 75 between the inner and outer nuts 78, thus fixing indicator 75 against angular displacement about the axis of stud 58.

The indicator shown in FIGS. 5, 6, 7, 9 and 10 operates in the following manner. As stud plate 55 is mounted on the left wall of the garage, the parts normally occupy the position of FIGS. 5 and 6 in which they are retained by gravity forces. When a car is moved into the garage, as indicated by the arrow 81 in FIGS. 6 and 7, the bumper of the car will strike contact plate 65 which has the angular position illustrated in FIG. 6. At this time, a reference mark "15" will appear in each of the windows 80. As the car moves inwardly, after contacting plate 65, the other indicator marks 74 will appear in windows 80 in decreasing numerical order, thus indicating that the car is approaching its limit of movement. Finally, when the car reaches its limit of movement, as indicated in FIG. 7, disk 70 will have been rotated 45° to the position wherein the word "STOP" appears in each of the windows 80, and contact plate 65 extends substantially perpendicularly. The car operator now knows that his car is at the limit of movement toward the rear wall or other obstruction.

To mount the device upon the left wall of the garage, it is merely necessary to loosen set screw 66, disengage contact plate 65 by removing bolts 67, reconnect contact plate 65 on the opposite "side" of tubular extension 64 from that indicated in FIG. 6, and in the same angular orientation, and then reset set screw 66. Contact plate 65, in its new position, will occupy a position indicated in FIG. 6. Thus, it will be seen that the indicator device may be positioned on either wall of the garage without using any substitute parts or the like.

The arrangement of FIG. 8 is substantially identical with that of FIGS. 5, 6 and 7, so that the same parts have been indicated with the same reference numerals. The only difference between the embodiment of FIG. 8 and that of FIGS. 5, 6 and 7 is that the "window" indicator 75 of FIGS. 5, 6 and 7 has been replaced by a double ended, diamond-shape, pointer indicator 85 which is secured immovably on stud 58 and in generally horizontal position, by nuts 78. In this case, pointed ends 86 of indicator 85 cooperate with marks 74 and the words "STOP" to provide the indication to the driver of the car. It will be appreciated that the indicator of FIG. 8 may likewise be mounted on either wall of the garage with only a minor readjustment of parts.

FIGS. 11, 12 and 13 illustrate another embodiment of the invention in which substantially all of the parts are identical with those shown in FIGS. 5, 6 and 7, and assembled in the identical manner, the only difference being the form of the fixed indicator 90, and in the assembly of the parts. Fixed indicator 90 comprises a substantially flat rectangular bar having a central portion 91 formed within aperture 92 freely received over the stud 58. The ends of indicator 90 are bent perpendicularly to central portion or bar 91, as indicated at 92, and then bent again toward each other to form the points 95. Points 95 extend generally parallel to central bar 91, but are spaced substantially outwardly therefrom.

In this embodiment, indicator 90 is mounted on stud 58 before lever 60 and disk 70 are mounted thereon. Thus, one of the nuts 78 is threaded inwardly along stud 58 until it engages plate 55. Stud 58 is then extended through aperture 92 of central bar 91 of indicator 90 and, with the bar portion 91 extending horizontally, the second nut 78 is threaded onto stud 58 and tightened against central part 91 of indicator 90. Then lever 60 and disk 70 are assembled over stud 58, in the manner previously described, with disk 70 being assembled by first being slipped under the pointed ends 95 and then inwardly over stud 58. The points 95 cooperate with the words "STOP" and with the reference indicators or marks 74 in the same manner as previously described.

The threaded interengagement between apertures 63, in arm 61, and stud 58 is an important feature of the invention. The threads are so designed that lever 60 can swing easily on stud 58, while being retained in adjusted position without the use of spacers and/or retaining nuts. This contributes to easy erection, assembly and adjustment of the indicator. The importance of proper clearance between lever arm 61 and plate 55 will be apparent when it is realized that many garage walls are out of plumb and most have very rough surfaces.

An obvious variation of the formation of lever 60 is to provide enlarged and unthreaded apertures 63 and to weld or braze a pair of nuts to arm 61 in axial alignment with each other and with aperture 63. This modification is believed sufficiently apparent that its illustration in the drawings is unnecessary.

While specific embodiments of the invention have been shown and described in detail to illustrate the application of the principles of the invention, it will be understood that the invention may be embodied otherwise without departing from such principles.

What is claimed is:

1. A car position indicator, for indicating the position of a car relative to an obstruction in its path of movement, comprising, in combination, a plate constructed for securement to an upright surface parallel to the direction of car movement; a pivot extending substantially horizontally outwardly from said plate; a lever including a pair of rigidly interrelated, mutually perpendicular arm means, one arm means being a normally upright arm means pivotal on said pivot and the other arm means being a normally horizontal arm means extending from the lower end of said normally upright arm means substantially parallel to said pivot and laterally into the path of movement of the car for contact by an end portion of the latter to swing said lever about said pivot; a first indicator element fixed to said upright arm means for movement therewith; and a second indicator element fixed relative to said pivot; said first and second indicator elements conjointly providing a continual visual indication of the position of the car, engaged with said horizontal arm means, relative to such obstruction.

2. A car position indicator, for indicating the position of a car relative to an obstruction in its path of movement, comprising, in combination, a plate constructed for securement to an upright surface parallel to the direction of car movement; a pivot extending substantially horizontally outwardly from said plate; a lever including a pair of rigidly interrelated, mutually perpendicular arm means, one arm means being a normally upright arm means pivotal on said pivot and the other arm means being a normally horizontal arm means extending from the lower end of said normally upright arm means substantially parallel to said pivot and laterally into the path of movement of the car for contact by an end portion of the latter to swing said lever about said pivot; a first indicator element fixed to said upright arm means for movement therewith; and a second indicator element fixed relative to said pivot; said first and second indicator elements conjointly providing a continual visual indication of the position of the car, engaged with said horizontal arm means, relative to such obstruction, said lever being gravity-biased to normally position said normally horizontal arm means at a location in advance of a proper parking position relative to the obstruction.

3. A car position indicator, for indicating the position of a car relative to an obstruction in its path of movement, comprising, in combination, a plate constructed for securement to an upright surface parallel to the direction of car movement; a pivot extending substantially horizontally outwardly from said plate; a lever including a pair of rigidly interrelated, mutually perpendicular arm means, one arm means being a normally upright arm means pivotal on said pivot and the other arm means being a normally horizontal arm means extending from the lower end of said normally upright arm means substantially parallel to said pivot and laterally into the path of movement of the car for contact by an end portion of the latter to swing said lever about said pivot; a first indicator element fixed to said upright arm means for movement therewith; and a second indicator element fixed relative to said pivot; said first and second indicator elements conjointly providing a continual visual indication of the position of the car, engaged with said horizontal arm means, relative to such obstruction; one of said indicator elements comprising a pointer and the other of said indicator elements comprising a calibrated scale over which the pointer is moved to indicate to the driver and proper position of the vehicle relative to the obstruction.

4. A car position indicator, as claimed in claim 1, in which said first indicator element comprises a pointer; said second indicator element comprising a scale fixed to the upright surface, and said pointer being movable over said scale.

5. A car position indicator, as claimed in claim 1, in which said upright surface constitutes a side wall of a garage having a rear wall; said first indicator comprising a pointer; said second indicator comprising a scale fixed to the garage rear wall and said pointer being movable relative to said scale.

6. A car position indicator, as claimed in claim 1, in which said upright surface comprises a side wall of a garage having a rear wall; said first indicator element comprising a pointer; said second indicator element comprising a chart fixed on said side wall, and said pointer being movable relative to said chart.

7. A car position indicator, as claimed in claim 6, in which said second indicator element comprises a second chart mounted on said rear wall, said first mentioned chart and said second chart extending from the intersection of said side and rear walls and constituting continuations of each other.

8. A car position indicator, for indicating the position of a car relative to an obstruction in its path of movement, comprising, in combination, a plate constructed for securement to an upright surface parallel to the direction of car movement; a pivot extending substantially horizontally outwardly from said plate; a lever including a pair of rigidly interrelated, mutually perpendicular arm means, one arm means being a normally upright arm means pivotal on said pivot and the other arm means being a normally horizontal arm means extending from the lower end of said normally upright arm means substantially parallel to said pivot and laterally into the path of movement of the car for contact by an end portion of the latter to swing said lever about said pivot; a first indicator element fixed to said upright arm means for movement therewith; a second indicator element fixed relative to said pivot; said first and second indicator elements conjointly providing a continual visual indication of the position of the car, engaged with said horizontal arm means, relative to such obstruction; and a weight secured to said lever and normally biasing said lever to a position in which said horizontal arm means is at a location in advance of a proper parking position relative to the obstruction.

9. A car position indicator, for indicating the position of a car relative to an obstruction in its path of movement, comprising, in combination, a plate constructed for securement to an upright surface parallel to the direction of car movement; a pivot extending substantially horizontally outwardly from said plate; a lever including a pair of rigidly interrelated, mutually perpendicular arm means, one arm means being a normally upright arm means pivotal on said pivot and the other arm means being a normally horizontal arm means extending from the lower end of said normally upright arm means substantially parallel to said pivot and laterally into the path of movement of the car for contact by an end portion of the latter to swing said lever about said pivot; a first indicator element fixed to said upright arm means for movement therewith; a second indicator element fixed relative to said pivot; said first and second indicator elements conjointly providing a continual visual indication of the position of the car, engaged with said horizontal arm means, relative to such obstruction; and a protective covering on said normally horizontal arm means.

10. A car position indicator, for indicating the position of a car relative to an obstruction in its path of movement, comprising, in combination, a plate constructed for securement to an upright surface parallel to the direction of car movement; a pivot extending substantially horizontally outwardly from said plate; a lever including a pair of rigidly interrelated, mutually perpendicular arm means, one arm means being a normally upright arm means pivotal on said pivot and the other arm means being a normally horizontal arm means extending from the lower end of said normally upright arm means substantially parallel to said pivot and laterally into the path of movement of the car for contact by an end portion of the latter to swing said lever about said pivot; a first indicator element fixed to said upright arm means for movement therewith; and a second indicator element fixed relative to said pivot; said first and second indicator elements conjointly providing a continual visual indication of the position of the car, engaged with said horizontal arm means, relative to such obstruction; said normally upright arm means being adjustable in length to preselect the vertical position of said normally horizontal arm means.

11. A car position indicator, for indicating the position of a car relative to an obstruction in its path of movement, comprising, in combination, a plate constructed for securement to an upright surface parallel to the direction of car movement; a threaded pivot stud extending substantially horizontally outwardly from said plate; a L-shape lever including a normally upright arm and a normally horizontal arm extending perpendicularly from the lower end of said normally upright arm; said normally upright arm having an aperture, intermediate its ends, whose axis is parallel to said normally horizontal arm, said aperture being internally threaded for threaded interengagement with said threaded stud pivot whereby said lever may be adjustably mounted along said pivot for free swinging about the axis thereof; said normally horizontal arm extending laterally parallel to the axis of said stud into the path of movement of the car; a substantially circular flat disk having a central aperture with a diameter in excess of the maximum external diameter of said threaded stud pivot whereby said disk may be mounted on said pivot for free rotation about the axis of the latter; means clamping said disk to said normally upright arm for conjoint angular displacement of said lever and said disk; said disk having thereon indicia indicating the position of the car relative to the obstruction; a relatively elongated indicator element cooperable with said disk, said indicator element including an aperture midway of its ends having a diameter in excess of the maximum external diameter of said stud, and having terminal portions cooperable with the indicia on said disk; and nut means threaded on said pivot stud and clamping said indicator element therebetween fixedly on said stud in a generally horizontal orientation; whereby, when said normally horizontal lever arm is engaged by an end portion of the vehicle, said lever and said disk will be displaced angularly about the axis of said pivot stud and relative to said indicator element to provide a continual visual indication of the position of the car relative to such obstruction.

12. A car position indicator, for indicating the position of a car relative to an obstruction in its path of movement, comprising, in combination, a plate constructed for securement to an upright surface parallel to the direction of car movement; a threaded pivot stud extending substantially horizontally outwardly from said plate; a L-shape lever including a normally upright arm and a normally horizontal arm extending perpendicularly from the lower end of said normally upright arm; said normally upright arm having an aperture, intermediate its ends, whose axis is parallel to said normally horizontal arm, said aperture being internally threaded for threaded interengagement with said threaded stud pivot whereby said lever may be adjustably mounted along said pivot for free swinging about the axis thereof; said normally horizontal arm extending laterally parallel to the axis of said stud into the path of movement of the car; a substantially circular flat disk having a central aperture with a diameter in excess of the maximum external diameter of said threaded stud pivot whereby said disk may be mounted on said pivot for free rotation about the axis of the latter; means clamping said disk to said normally upright arm for conjoint angular displacement of said lever and said disk; said disk having thereon indicia indicating the position of the car relative to the obstruction; a relatively elongated indicator element cooperable with said disk; said indicator element including an aperture midway of its ends having a diameter in excess of the maximum external diameter of said stud, and having terminal portions cooperable with the indicia on said disk; nut means threaded on said pivot stud and clamping said indicator element therebetween fixedly on said stud in a generally horizontal orientation; and a contact plate secured to said normally horizontal arm and positioned in the path of movement of the car for contact by an end portion of the latter to angularly displace said lever and said disk about the axis of said pivot stud relative to said indicator element to provide a continual visual indication of the position of the car relative to such obstruction.

13. A car position indicator, for indicating the position of a car relative to an obstruction in its path of movement, comprising, in combination, a plate constructed for securement to an upright surface parallel to the direction of car movement; a threaded pivot stud extending substantially horizontally outwardly from said plate; a L-shape lever including a normally upright arm and a normally horizontal arm extending perpendicularly from the lower end of said normally upright arm; said normally upright arm having an aperture, intermediate its ends, whose axis is parallel to said normally horizontal arm, said aperture being internally threaded for threaded interengagement with said threaded stud pivot whereby said lever may be adjustably mounted along said pivot for free swinging about the axis thereof; said normally horizontal arm extending laterally parallel to the axis of said stud into the path of movement of the car; a substantially circular flat disk having a central aperture with a diameter in excess of the maximum external diameter of said threaded stud pivot whereby said disk may be mounted on said pivot for free rotation about the axis of the latter; means clamping said disk to said normally upright arm for conjoint angular displacement of said lever and said disk; said disk having thereon indicia indicating the position of the car relative to the obstruction; a relatively elongated indicator element cooperable with said disk, said indicator element including an aperture midway of its ends having a diameter in excess of the maximum external diameter of said stud, and having terminal portions cooperable with the indicia on said disk; and nut means threaded on said pivot stud and clamping said indicator element therebetween fixedly on said stud in a generally horizontal orientation; said lever having a tubular cross section; said normally horizontal arm extending laterally into the path of movement of the car for contact by an end portion of the latter to angularly displace said upright arm and said disk about the axis of said pivot stud relative to said indicator element to provide a continual visual indication of the position of the car relative to such obstruction.

14. A car position indicator, for indicating the position of a car relative to an obstruction in its path of movement, comprising, in combination, a plate constructed for securement to an upright surface parallel to the direction of car movement; a threaded pivot stud extending substantially horizontally outwardly from said plate; a L-shape lever including a normally upright arm and a normally horizontal arm extending perpendicularly from the lower end of said normally upright arm; said normally upright arm having an aperture, intermediate its ends; whose axis is parallel to said normally horizontal arm, said aperture being internally threaded for threaded interengagement with said threaded stud pivot whereby said threaded stud pivot whereby said lever may be adjustably mounted along said pivot for free swinging about the axis thereof; said normally horizontal arm extending laterally parallel to the axis of said stud into the path of movement of the car; a substantially circular flat disk having a central aperture with a diameter in excess of the maximum external diameter of said threaded stud pivot whereby said disk may be mounted on said pivot for free rotation about the axis of the latter; means clamping said disk to said normally upright arm for conjoint angular displacement of said lever and said disk; said disk having thereon indicia indicating the position of the car relative to the obstruction; a relatively elongated indicator element cooperable with said disk, said indicator element including an aperture midway of its ends having a diameter in excess of the maximum external diameter of said stud, and having terminal portions cooperable with the indicia on said disk; nut means threaded on said pivot-stud and clamping said indicator element therebetween fixedly on said stud in a generally horizontal orientation; a tubular extension piece telescoped over said normally horizontal arm and angularly and longitudinally adjustable relative to the latter; securing means effective to maintain said tubular extension member in adjusted position on said normally horizontal arm; and a contact plate adjustably secured to said tubular extension member and positioned in the path of movement of the car for contact by an end portion of the latter to angularly displace said lever and said disk about the axis of said pivot stud relative to said indicator element to provide a continual visual indication of the position of the car relative to such obstruction.

15. A car position indicator, for indicating the position of a car relative to an obstruction in its path of movement, comprising, in combination, a plate constructed for securement to an upright surface parallel to the direction of car movement; a threaded pivot stud extending substantially horizontally outwardly from said plate; a L-shape lever including a normally upright arm and a normally horizontal arm extending perpendicularly from the lower end of said normally upright arm; said normally upright arm having an aperture, intermediate its ends, whose axis is parallel to said normally horizontal arm; said aperture being internally threaded for threaded interengagement with said thread stud pivot whereby said lever may be adjustably mounted along said pivot for free swinging about the axis thereof; said normally horizontal arm extending laterally parallel to the axis of said stud into the path of movement of the car; a substantially circular flat disk having a central aperture with a diameter in excess of the maximum external diameter of said threaded stud pivot whereby said disk may be mounted on said pivot for free rotation about the axis of the latter; means clamping said disk to said normally upright arm for conjoint angular displacement of said lever and said disk for conjoint angular displacement of said lever and said disk; said disk having thereon indicia indicating the position of the car relative to the obstruction; a relatively elongated indicator element cooperable with said disk, said indicator element including an aperture midway of its ends having a diameter in excess of the maximum external diameter of said stud, and having terminal portions cooperable with the indicia on said disk; nut means threaded on said pivot stud and clamping said indicator element therebetween fixedly on said stud in a generally horizontal orientation; a tubular extension piece telescoped over said normally horizontal arm and angularly and longitudinally adjustable relative to the latter; securing means effective to maintain said tubular extension member in adjusted position on said normally horizontal arm; and a contact plate adjustably secured to said tubular extension member and positioned in the path of movement of the car for contact by an end portion of the latter to angularly displace said lever and disk about the axis of said pivot stud relative to said indicator element to provide a continual visual indication of the position of the car relative to such obstruction; said indicator element comprising a substantially flat bar overlying the forward face of said disk and having enlarged terminal portions formed with windows exposing the indicia on said disk.

16. A car position indicator, for indicating the position of a car relative to an obstruction in its path of movement, comprising, in combination, a plate constructed for securement to an upright surface parallel to the direction of car movement; a threaded pivot stud extending substantially horizontally outwardly from said plate; a L-shaped lever including a normally upright arm and a normally horizontal arm extending perpendicularly from the lower end of said normally upright arm; said normally upright arm having an aperture, intermediate its ends, whose axis is parallel to said normally horizontal arm, said aperture being internally threaded for threaded interengagement with said threaded stud pivot whereby said lever may be adjustably mounted along said pivot for free swinging about the axis thereof; said normally horizontal arm extending laterally parallel to the axis of said stud into the path of movement of the car; a substantially circular flat disk having a central aperture with a diameter in excess of the maximum external diameter of said threaded stud pivot whereby said disk may be mounted on said pivot for free rotation about the axis of the latter; means clamping said disk to said normally upright arm for conjoint angular displacement of said lever and said disk; said disk having thereon indicia indicating the position of the car relative to the obstruction; a relatively elongated indicator element cooperable with said disk, said indicator element including an aperture midway of its ends having a diameter in excess of the maximum external diameter of said stud, and having terminal portions cooperable with the indicia on said disk; nut means threaded on said pivot stud and clamping said indicator element therebetween fixedly on said stud in a generally horizontal orientation; a tubular extension piece telescoped over said normally horizontal arm and angularly and longitudinally adjustable relative to the latter; securing means effective to maintain said tubular extension member in adjusted position on said normally horizontal arm; and a contact plate adjustably secured to said tubular extension member and positioned in the path of movement of the car for contact by an end portion of the latter to angularly displace said lever and said disk about the axis of said pivot stud relative to said indicator element to provide a continual visual indication of the position of the car relative to such obstruction; said indicator element comprising a substantially flat bar which is diamond-shape in plan and has a length substantially less than the diameter of said disk; said indicator element overlying the exposed surface of said disk and the ends of said indicator element constituting pointers cooperable with the indicia on said disk.

17. A car position indicator, for indicating the position of a car relative to an obstruction in its path of movement, comprising, in combination, a plate constructed for securement to an upright surface parallel to the direction of car movement; a threaded pivot stud extending substantially horizontally outwardly from said plate; a L-shape lever including a normally upright arm and a normally horizontal arm extending perpendicularly from the lower end of said normally upright arm; said normally upright arm having an aperture, intermediate its ends, whose axis is parallel to said normally horizontal arm, said aperture being internally threaded for threaded interengagement with said threaded stud pivot whereby said lever may be adjustably mounted along said pivot for free swinging about the axis thereof; said normally horizontal arm extending laterally parallel to the axis of said stud into the path of movement of the car; a substantially circular flat disk having a central aperture with a diameter in excess of the maximum external diameter of said threaded stud pivot whereby said disk may be mounted on said pivot for free rotation about the axis of the latter; means clamping said disk to said normally upright arm for conjoint angular displacement of said lever and said disk; said disk having thereon indicia indicating the position of the car relative to the obstruction; a relatively elongated indicator element cooperable with said disk, said indicator element including an aperture midway of its ends having a diameter in excess of the maximum external diameter of said stud, and having terminal portions cooperable with the indicia on said disk; nut means threaded on said pivot stud and clamping said indicator element therebetween fixedly on said stud in a generally horizontal orientation; a tubular extension piece telescoped over said normally horizontal arm and angularly and longitudinally adjustable relative to the latter; securing means effective to maintain said tubular extension member in adjusted position on said normally horizontal arm; and a contact plate adjustably secured to said tubular extension member and positioned in the path of movement of the car for contact by an end portion of the latter to angularly displace said lever and said disk about the axis of said pivot stud relative to said indicator element to provide a continual visual indication of the car relative to such obstruction; said indicator element comprising a substantially flat bar having a central portion extending substantially parallel to said disk, and located between said disk and said plate carrying said pivot stud; said indicator element including end portions each extending perpendicularly outwardly from said central portion and embracing the periphery of said disk, said end portions further being formed with pointers extending over the exterior surface of said disk toward each other and cooperating with the indicia on said disk.

18. A car position indicator, for indicating the position of a car relative to an obstruction in its path of movement, comprising, in combination, a plate constructed for securement to an upright surface parallel to the direction of car movement; a threaded pivot stud extending substantially outwardly from said plate; a L-shape lever including a normally upright arm and a normally horizontal arm extending perpendicularly from the lower end of said normally upright arm; said normally upright arm having an aperture, intermediate its ends, whose axis is parallel to said normally horizontal arm, said aperture being internally threaded for threaded interengagement with said threaded stud pivot whereby said lever may be adjustably mounted along said pivot for free swinging about the axis thereof; said normally horizontal arm extending laterally parallel to the axis of said stud into the path of movement of the car; a substantially circular flat disk having a central aperture with a diameter in excess of the maximum external diameter of said threaded stud pivot whereby said disk may be mounted on said pivot for free rotation about the axis of the latter; means clamping said disk to said normally upright arm for conjoint angular displacement of said lever and said disk; said disk having thereon indicia indicating the position of the car relative to the obstruction; a relatively elongated indicator element cooperable with said disk, said indicator element including an aperture midway of its ends having a diameter in excess of the maximum external diameter of said stud, and having terminal portions cooperable with the indicia on said disk; and nut means threaded on said pivot stud and clamping said indicator element therebetween fixedly in a generally horizontal orientation; whereby, when said normally horizontal lever arm is engaged by an end portion of the vehicle, said lever and said disk will be displaced angularly about the axis of said pivot stud and relative to said indicator element to provide a continual visual indication of the position of the car relative to such obstruction; the exposed surface of said disk being divided into quadrants, and said indicia being located in a pair of diametrically opposed quadrants; said means clamping said disk to said upright lever arm providing for adjustment of said disk to preselect the initial orientation of said indicia carrying quadrants relative to said indicator; whereby said car position indicator may be mounted on either side wall of a garage.

19. A car position indicator, for indicating the position of a car relative to an obstruction in its path of movement, comprising, in combination, a plate constructed for securement to an upright surface parallel to the direction of car movement; a threaded pivot stud extending substantially horizontally outwardly from said plate; a L-shape lever including a normally upright arm and a normally horizontal arm extending perpendicularly from the lower end of said normally upright arm; said normally upright arm having an aperture, intermediate its ends, whose axis is parallel to said normally horizontal arm; internal thread means associated with said aperture for threaded interengagement with said threaded stud pivot whereby said lever may be adjustably mounted along said pivot for free swinging about the axis thereof; said normally horizontal arm extending laterally parallel to the axis of said stud into the path of movement of the car; a substantially circular flat disk having a central aperture whereby said disk may be mounted on said pivot for free rotation about the axis of the latter; means clamping said disk to said normally upright arm for conjoint angular displacement of said lever and said disk; said disk having thereon indicia indicating the position of the car relative to the obstruction; a relatively elongated indicator element cooperable with said disk, said indicator element including an aperture midway of its ends, and having terminal portions cooperable with the indicia on said disk; nut means threaded on said pivot stud and clamping said indicator element therebetween fixedly on said stud in a generally horizontal orientation; whereby, when said normally horizontal lever arm is engaged by an end portion of the vehicle, said lever and said disk will be displaced angularly about the axis of said pivot stud and relative to said indicator element to provide a continual visual indication of the position of the car relative to such obstruction; said internal thread means having an inner diameter such that said upright arm has a low-friction bearing contact with the thread of said pivot stud.

20. A car position indicator, as claimed in claim 14, wherein said contact plate normally lies in a plane extending at an oblique angle to the plane including the axis of said pivot stud, the axis of said upright arm, and the axis of said tubular extension member.

References Cited by the Examiner
UNITED STATES PATENTS

| | | | |
|---|---|---|---|
| 884,964 | 4/1908 | Voss | 116—132 |
| 1,981,188 | 11/1934 | Pavitt | 116—28 |
| 2,193,747 | 3/1940 | Thompson | 116—28 |
| 2,454,896 | 11/1948 | Traub | 116—28 X |
| 2,581,788 | 1/1952 | Dunn | 39—6 |
| 2,731,934 | 1/1956 | Hausmann et al. | 116—28 |
| 2,784,692 | 3/1957 | Ballesteros | 116—28 |
| 2,879,350 | 3/1959 | Howell | 116—28 |
| 3,044,435 | 7/1962 | Reardon | 116—173 |

LOUIS J. CAPOZI, *Primary Examiner.*